(12) United States Patent
Suzuki et al.

(10) Patent No.: US 9,064,638 B2
(45) Date of Patent: Jun. 23, 2015

(54) DIELECTRIC CERAMIC, STACK CERAMIC ELECTRONIC COMPONENT, AND METHOD OF MANUFACTURING THESE

(71) Applicant: MURATA MANUFACTURING CO., LTD., Nagaokakyu-shi, Kyoto-fu (JP)

(72) Inventors: Shoichiro Suzuki, Nagaokakyo (JP); Masanori Nakamura, Nagaokakyo (JP); Koichi Banno, Nagaokakyo (JP); Taisuke Kanzaki, Nagaokakyo (JP); Akihiro Shiota, Nagaokakyo (JP); Masahiro Otsuka, Nagaokakayo (JP)

(73) Assignee: MURATA MANUFACTURING CO., LTD., Nagokakyo-Shi, Kyoto-Fu (JP)

( * ) Notice: Subject to any disclaimer, the term of this patent is extended or adjusted under 35 U.S.C. 154(b) by 124 days.

(21) Appl. No.: 13/803,925

(22) Filed: Mar. 14, 2013

(65) Prior Publication Data

US 2013/0194717 A1    Aug. 1, 2013

Related U.S. Application Data

(63) Continuation of application No. PCT/JP2011/070712, filed on Sep. 12, 2011.

(30) Foreign Application Priority Data

Sep. 30, 2010    (JP) .................................. 2010-221937

(51) Int. Cl.
*C04B 35/468* (2006.01)
*H01G 4/06* (2006.01)
(Continued)

(52) U.S. Cl.
CPC .............. *H01G 4/30* (2013.01); *C04B 35/4682* (2013.01); *C04B 35/49* (2013.01); *C04B 2235/3208* (2013.01); *C04B 2235/3213* (2013.01); *C04B 2235/3215* (2013.01);
(Continued)

(58) Field of Classification Search
CPC .... C04B 35/468; C04B 35/4682; H01G 4/10; H01G 4/30
USPC .......................................... 501/137, 138, 139
See application file for complete search history.

(56) References Cited

U.S. PATENT DOCUMENTS 7,781,360 B2    8/2010    Hasegawa et al.
7,994,084 B2    8/2011    Lyoo et al.
(Continued)

FOREIGN PATENT DOCUMENTS

JP    63-160108 A    7/1988
JP    2004026641 A    1/2004
(Continued)

OTHER PUBLICATIONS

International Search Report and Written Opinion issued in PCT/JP2011/070712, mailed Dec. 13, 2011.

*Primary Examiner* — Karl Group
(74) *Attorney, Agent, or Firm* — Arent Fox LLP

(57) ABSTRACT

A dielectric ceramic enabling low-temperature firing and exhibiting good dielectric characteristics, and a stack ceramic electronic component using the same are provided. The dielectric ceramic containing $(Ba_{1-x-y}Ca_xSr_y)_m(Ti_{1-z}Zr_z)O_3$ ($1.005 \leq m \leq 1.2$, $0 \leq x+y \leq 0.2$, and $0 \leq z \leq 0.2$) as a major component and an amount of Bi relative to 100 parts by mol of the major component which is 1.0 part by mol or more and 40 parts by mol or less.

20 Claims, 1 Drawing Sheet

(51) Int. Cl.
| | |
|---|---|
| H01G 4/30 | (2006.01) |
| C04B 35/49 | (2006.01) |
| H01B 3/12 | (2006.01) |
| H01G 4/12 | (2006.01) |
| H01G 4/00 | (2006.01) |
| C04B 35/626 | (2006.01) |
| C01G 25/00 | (2006.01) |
| C01G 29/00 | (2006.01) |

(52) U.S. Cl.
CPC .......... *C04B 2235/3248* (2013.01); *C04B 2235/3281* (2013.01); *C04B 2235/3298* (2013.01); *C04B 2235/79* (2013.01); *H01B 3/12* (2013.01); *H01G 4/1227* (2013.01); *C04B 35/468* (2013.01); *H01G 4/00* (2013.01); *C04B 35/62685* (2013.01); *C04B 2235/6562* (2013.01); *C04B 2235/768* (2013.01); *C01G 25/006* (2013.01); *C01G 29/006* (2013.01)

(56) References Cited

U.S. PATENT DOCUMENTS

| | | | |
|---|---|---|---|
| 8,748,329 B2* | 6/2014 | Nakamura et al. | 501/138 |
| 2009/0011923 A1* | 1/2009 | Hasegawa et al. | 501/138 |
| 2013/0342958 A1* | 12/2013 | Suzuki et al. | 361/301.4 |

FOREIGN PATENT DOCUMENTS

| | | | |
|---|---|---|---|
| JP | 2007-290940 A | | 11/2007 |
| JP | 2008254935 | * | 10/2008 |
| JP | 2009-132606 A | | 6/2009 |

* cited by examiner

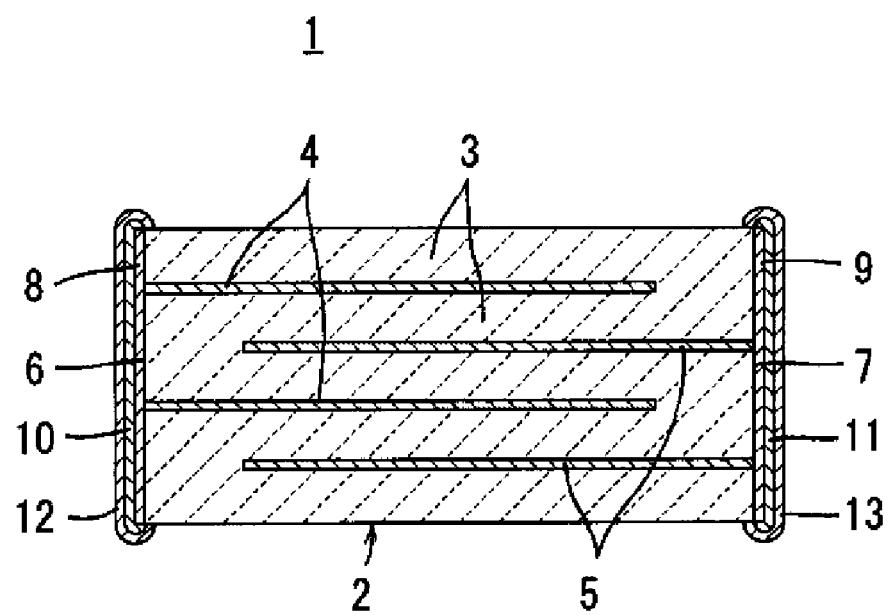

DIELECTRIC CERAMIC, STACK CERAMIC ELECTRONIC COMPONENT, AND METHOD OF MANUFACTURING THESE

This is a continuation of application Serial No. PCT/JP2011/070712, filed Sep. 12, 2011, the entire contents of which are incorporated herein by reference.

TECHNICAL FIELD

The present invention relates to a dielectric ceramic used in a stack ceramic electronic component such as that represented by a stack ceramic capacitor.

BACKGROUND ART

Referring to the FIGURE, first a stack ceramic capacitor 1 which is a representative example of a stack ceramic electronic component according to this invention will be described.

The stack ceramic capacitor 1 has a stack body 2 constituted of a plurality of stacked dielectric ceramic layers 3 and a plurality of internal electrodes 4 and 5 formed along the interfaces between the dielectric ceramic layers 3.

First and second external electrodes 8 and 9 are formed at positions different from each other on an outer surface of the stack body 2. In the stack ceramic capacitor 1 shown in the FIGURE, the first and second external electrodes 8 and 9 are formed respectively on end surfaces 6 and 7 of a stack body 5 that oppose each other. Among the internal electrodes 4 and 5, there are a plurality of first internal electrodes 4 that are electrically connected to the first external electrode 8 and a plurality of second internal electrodes 5 that are electrically connected to the second external electrode 9. These first and second internal electrodes 4 and 5 are alternately disposed relative to the stack direction. On the surface of the external electrodes 8 and 9, first plating layers 10, 11 and second plating layers 12, 13 are formed if needed.

Scale reduction in particular is required in stack ceramic capacitors. Therefore, in the manufacturing process, a technique of simultaneously firing after green sheets of dielectric ceramic and internal electrode layers are stacked. For the purpose of cost reduction, a base metal such as Ni is used in the internal electrodes of the stack ceramic capacitors.

In recent years, thickness reduction in internal electrodes has been keenly demanded as a thickness reduction in dielectric ceramic layers proceeded further. However, when the thicknesses of the internal electrodes are reduced, there is a problem in that the covering ratio of the internal electrodes tends to decrease due to the metal grains coming to have a spherical shape, thereby raising a need of firing at a lower temperature.

Due to the demands for various characteristics on stack ceramic electronic components, there has also arisen a need to use metals of various kinds such as Ag and Cu as a metal for the internal electrodes. Also due to such reasons, there has arisen a need to fire at a further lower temperature.

Because of the above considerations, a ceramic material capable of being fired at a low temperature and exhibiting excellent dielectric characteristics is demanded.

Patent Document 1 discloses a barium titanate series dielectric porcelain composition suitable for multi-layer substrates or stack ceramic capacitors and states that the composition can be fired at 1000° C. or lower.

Patent Document 2 discloses a barium titanate series dielectric porcelain composition suitable for stack ceramic substrates and states that the composition can be fired at 1000° C. or lower.

PRIOR ART PATENT DOCUMENTS

Patent Document 1: JP 2007-290940 A
Patent document 2: JP 2009-132606 A

DISCLOSURE OF THE INVENTION

Problem to be Solved by the Invention

The dielectric constant is less than 1500 in the dielectric porcelain composition disclosed in Patent Document 1, raising a problem in that it is difficult to meet the demand for the stack ceramic capacitors of recent years coming for a smaller scale and a larger capacity.

The dielectric constant is also less than 1500 at most in the dielectric porcelain composition disclosed in Patent Document 2, raising the same problem of difficulty to meet the demands for the stack ceramic capacitors to have a smaller scale and a larger capacity.

Therefore, an object of the present invention is to provide a dielectric ceramic enabling sufficient low-temperature firing and exhibiting good dielectric characteristics.

Means for Solving the Problem

The dielectric ceramic of the present invention is a dielectric ceramic comprising $(Ba_{1-x-y}Ca_xSr_y)_m(Ti_{1-z}Zr_z)O_3$ ($1.005 \leq m \leq 1.2$, $0 \leq x+y \leq 0.2$, and $0 \leq z \leq 0.2$) as a major component and also comprising Bi, wherein the content of the Bi relative to 100 parts by mol of the major component is 1.0 part by mol or more and 40 parts by mol or less.

It is preferable that the dielectric ceramic of the present invention further contains Cu. A desirable content thereof is 0.1 parts by mol or more and 1 part by mol or less relative to 100 parts by mol of the major component.

The present invention is also directed to a stack ceramic electronic component comprising a stack body including a plurality of stacked dielectric ceramic layers and a plurality of internal electrodes formed along the interfaces between the ceramic layers, and an external electrode formed on an outer surface of the stack body, wherein the dielectric ceramic layers contain the dielectric ceramic of the present invention.

The present invention is also directed to a method of manufacturing the dielectric ceramic of the present invention. That is, the present invention provides a method of manufacturing a dielectric ceramic by which a dielectric ceramic is obtained by using a dielectric ceramic comprising $(Ba_{1-x-y}Ca_xSr_y)_m(Ti_{1-z}Zr_z)O_3$ ($1.005 \leq m \leq 1.2$, $0 \leq x+y \leq 0.2$, and $0 \leq z \leq 0.2$) as a major component, and comprising a Bi compound, wherein the content of the Bi compound relative to 100 parts by mol of the major component is 1.0 part by mol or more and 40 parts by mol or less in terms of Bi.

It is preferable that the method of manufacturing a dielectric ceramic of the present invention further contains a Cu compound. A desirable content thereof is 0.1 parts by mol or more and 1 part by mol or less in terms of Cu relative to 100 parts by mol of the major component.

Further, the present invention is also directed to a method of manufacturing a stack ceramic electronic component using the method of manufacturing a dielectric ceramic of the present invention.

Effect of the invention

According to the present invention, a dielectric ceramic enabling sufficient low-temperature firing and exhibiting good dielectric characteristics can be provided, and this can greatly contribute to making the stack ceramic electronic components have a smaller scale and higher performance.

BRIEF EXPLANATION OF DRAWING

The FIGURE is a schematic view illustrating one example of a stack ceramic capacitor which is an example of the stack ceramic electronic component of the present invention.

MODE FOR CARRYING OUT THE INVENTION

The dielectric ceramic of the present invention contains a barium titanate series compound $(Ba_{1-x-y}Ca_xSr_y)_m(Ti_{1-z}Zr_z)O_3$ as a major component and also contains Bi. Low-temperature sintering, high dielectric constant, and low dielectric loss are achieved by a synergistic effect of the presence of Bi and the state such that m is suitably larger than 1.

When m is larger than 1, the residual Ba promotes the action of Bi as a liquid phase component, whereby sintering at a lower temperature is achieved. Also, the above-described liquid phase component restrains the adverse effects on the dielectric constant to the minimum after the sintering, and also the dielectric loss can be reduced.

When the content of Bi exceeds 40 parts by mol or when the value of m exceeds 1.2, it is not preferable because the dielectric constant decreases.

The major component of the dielectric ceramic of the present invention is made of barium titanate as a base, where part of Ba thereof may be substituted with Ca and/or Sr, and part of Ti may be substituted with Zr. However, when the sum x+y of the substitution amounts at the Ba sites exceeds 0.2 or when the Zr substitution amount z at the Ti sites exceeds 0.2, there will be adverse effects on the low-temperature sintering. This is considered to be because the content of the above substituted elements has some sort of influence on the stability of the liquid phase that is formed by Bi.

When it is desired that the sintering is carried out at a further lower temperature, it may be sufficient that Cu is further added so that the above-described liquid phase contributes to the low-temperature sintering more effectively. When the content of Cu relative to 100 parts by mol of the major component is from 0.1 to 1 part by mol, the dielectric loss tends to be restrained to be lower even in the case of further lower-temperature firing.

As subcomponents in the present invention, rare earth elements, Mg, Mn, V, Al, Ni, Co, Zn, and the like may be contained within a range that does not deteriorate the object of the present invention. Also, unavoidable impurities such as Hf may be contained.

In constituting a stack ceramic electronic component using the dielectric ceramic of the present invention, various metal species are used as internal electrodes. For example, metals having a comparatively low melting point, such as Ag and Cu, may be used. Also, co-firing with an internal electrode of Al may be carried out in an oxidizing atmosphere. In this case, there will be an advantage such that the structural defects in the stack body can be reduced.

Next, one example of a method for manufacturing a dielectric ceramic of the present invention will be described.

First, as starting source materials of the major component, powders of oxides or carbonates of Ba, Ca, Sr, Ti, and Zr are prepared. The powders of these starting source materials are weighed, mixed, and crushed in a liquid medium. After drying, the obtained mixed powder is thermally treated to obtain a powder of $(Ba_{1-x-y}Ca_xSr_y)(Ti_{1-z}Zr_z)O_3$, which serves as the major component. This method is generally referred to as a solid phase synthesis method; however, a wet synthesis method such as a hydrothermal synthesis method, a hydrolysis method, an oxalic acid method, or the like may be used. The weighing is done so that m satisfies 1.005 to 1.2.

Next, a predetermined amount of a Bi compound and optionally a Cu compound in accordance with the need therefor are added to this major component powder. The Bi compound and the Cu compound are not particularly limited as long as the object of the present invention is not deteriorated; however, these are preferably oxides in view of the low-temperature sintering.

The amounts of addition of the Bi compound and the Cu compound are adjusted so that the contents of Bi and Cu relative to the major component will be appropriate. Also, a compound powder of Ba, Ca, or Sr may be added at this time point in order to make adjustments to satisfy $1.005 \leq m \leq 1.2$. By mixing these in a liquid and drying, a ceramic as a final source material, for example, a ceramic powder, is obtained.

The steps following this process will be described using as an example a stack ceramic capacitor, which is one example of the stack ceramic electronic component of the present invention.

The above-described ceramic powder is prepared. This ceramic powder is mixed with an organic binder component in accordance with need in a solvent, so that a ceramic slurry is prepared. This ceramic slurry is subjected to sheet molding to obtain a ceramic green sheet.

Next, a conductor film that will be an internal electrode is formed on the ceramic green sheet. There are several methods therefor which can be used. A method by which a paste containing metal particles and organic vehicles is screen-printed into a desired pattern is convenient. Besides this, there are a method of transcribing a metal foil and a method of forming a conductor film while masking by a vacuum thin film forming method.

In this manner, multiple layers of the ceramic green sheets and internal electrode layers are superposed and press-bonded to obtain a crude stack body before firing.

This crude stack body is fired at a predetermined temperature in a predetermined atmosphere in a firing furnace, whereby a ceramic stack body including a ceramic sintered body is obtained.

External electrodes are formed at sites where internal electrodes in this ceramic stack body are exposed to complete a stack ceramic capacitor. Examples of the method of forming the external electrode include a method of applying a paste containing glass frit and metal particles such as Cu or Ag and attaching the paste by firing, and the like. Further, a plating layer such as Ni or Sn is formed in accordance with the needs on the surface of this external electrode.

The stack ceramic electronic component of the present invention can be applied not only to stack ceramic capacitors but also to various electronic components such as ceramic multi-layer substrates.

EXAMPLES

Experimental Example 1

First, as starting source materials, powders of $BaCO_3$, $CaCO_3$, $SrCO_3$, $TiO_2$, and $ZrO_2$ were prepared. These were weighed so as to satisfy x, y, and z of $(Ba_{1-x-y}Ca_xSr_y)(Ti_{1-z}$ $Zr_z)O_3$ shown by the samples 1 to 53 of Table 1, and mixed in water for 24 hours in a ball mill.

After mixing, the resultant material was dried and this blended powder was subjected to thermal treatment synthesis under conditions of 1000° C. for 2 hours. In this manner, a major component powder of $(Ba_{1-x-y}Ca_xSr_y)(Ti_{1-z}Zr_z)O_3$ was obtained.

Next, a $Bi_2O_3$ powder was prepared, weighed so as to satisfy the content shown in Table 1 relative to 100 parts by mol of the major component, and added to the major component powder.

Also, a $BaCO_3$ powder was prepared, weighed so that m of the major component $(Ba_{1-x-y}Ca_xSr_y)_m(Ti_{1-z}Zr_z)O_3$ would be the value shown in Table 1, and added to the major component powder. This was mixed in water for 24 hours in a ball mill and dried to form this into a ceramic powder.

This ceramic powder was dispersed in an organic solvent containing ethanol and toluene, and an organic binder of the polyvinylbutyral series was added and mixed, so as to form a ceramic slurry. This ceramic slurry was subjected to sheet molding to obtain ceramic green sheets.

Next, an Ag internal electrode layer was formed by a sputtering method on the ceramic green sheets. The ceramic green sheets after forming this Ag internal electrode layer were stacked so that the drawn-out sides of the Ag internal electrode layers would be alternately arranged, and press-bonded to obtain a crude stack body.

This crude stack body was heated at 270° C. in an ambient atmosphere to remove the binder. Thereafter, the temperature was raised at a temperature-raising rate of 20° C./minute and the resultant body was fired at 850° C. for 120 minutes in an ambient atmosphere. An Ag paste containing an epoxy resin was applied on both end surfaces of the obtained stack body and cured at 180° C. in an ambient atmosphere to form external electrodes connected to the internal electrode.

The stack ceramic capacitor obtained in the above-described manner had a length of 3.2 mm, a width of 1.6 mm, a thickness of 1.6 mm, a ceramic layer thickness of 4.8 μm, an internal electrode thickness of 1 μm, an internal electrode overlapping area of 2.9 μm², and an effective number of layers of 100.

With regard to the obtained samples, the electrostatic capacitance and the dielectric loss were measured using an automatic bridge-type measuring apparatus under conditions of 1 Vrms and 1 KHz. The values of the dielectric loss and the values of dielectric constant calculated from the above electrostatic capacitance are shown in Table 1.

TABLE 1

| Sample number | x | y | z | m | $Bi_2O_3$ (parts by mol) | Dielectric constant | tanδ (%) |
|---|---|---|---|---|---|---|---|
| 1 | 0 | 0 | 0 | 1 | 0.6 | Insufficiently sintered | Insufficiently sintered |
| 2 | 0 | 0 | 0 | 1 | 1 | Insufficiently sintered | Insufficiently sintered |
| 3 | 0 | 0 | 0 | 1 | 6 | Insufficiently sintered | Insufficiently sintered |
| 4 | 0 | 0 | 0 | 1 | 10 | Insufficiently sintered | Insufficiently sintered |
| 5 | 0 | 0 | 0 | 1 | 20 | Insufficiently sintered | Insufficiently sintered |
| 6 | 0 | 0 | 0 | 1.005 | 0 | Insufficiently sintered | Insufficiently sintered |
| 7 | 0 | 0 | 0 | 1.01 | 0 | Insufficiently sintered | Insufficiently sintered |
| 8 | 0 | 0 | 0 | 1.05 | 0 | Insufficiently sintered | Insufficiently sintered |
| 9 | 0 | 0 | 0 | 1.1 | 0 | Insufficiently sintered | Insufficiently sintered |
| 10 | 0 | 0 | 0 | 1.2 | 0 | Insufficiently sintered | Insufficiently sintered |
| 11 | 0 | 0 | 0 | 1.02 | 0.3 | Insufficiently sintered | Insufficiently sintered |
| 12 | 0 | 0 | 0 | 1.02 | 0.5 | 1560 | 2.8 |
| 13 | 0 | 0 | 0 | 1.02 | 1 | 1860 | 2.6 |
| 14 | 0 | 0 | 0 | 1.02 | 6 | 2200 | 2.4 |
| 15 | 0 | 0 | 0 | 1.02 | 10 | 1765 | 2.4 |
| 16 | 0 | 0 | 0 | 1.02 | 20 | 1620 | 2.2 |
| 17 | 0 | 0 | 0 | 1.02 | 25 | 1450 | 2.2 |
| 18 | 0 | 0 | 0 | 1.003 | 6 | Insufficiently sintered | Insufficiently sintered |
| 19 | 0 | 0 | 0 | 1.005 | 5 | 1520 | 2.9 |
| 20 | 0 | 0 | 0 | 1.05 | 6 | 1800 | 2.8 |
| 21 | 0 | 0 | 0 | 1.1 | 5 | 1660 | 2.8 |
| 22 | 0 | 0 | 0 | 1.2 | 6 | 1680 | 2.6 |
| 23 | 0 | 0 | 0 | 1.25 | 5 | 1440 | 2.6 |
| 24 | 0 | 0 | 0 | 1.003 | 10 | Insufficiently sintered | Insufficiently sintered |
| 25 | 0 | 0 | 0 | 1.005 | 10 | 1600 | 2.9 |
| 26 | 0 | 0 | 0 | 1.05 | 10 | 1720 | 2.8 |
| 27 | 0 | 0 | 0 | 1.1 | 10 | 1650 | 2.8 |
| 28 | 0 | 0 | 0 | 1.2 | 10 | 1500 | 2.8 |
| 29 | 0 | 0 | 0 | 1.25 | 10 | 1370 | 2.8 |
| 30 | 0.05 | 0 | 0 | 1.02 | 0.3 | Insufficiently sintered | Insufficiently sintered |
| 31 | 0.06 | 0 | 0 | 1.003 | 6 | Insufficiently sintered | Insufficiently sintered |
| 32 | 0.05 | 0 | 0 | 1.02 | 5 | 2080 | 2.8 |
| 33 | 0.06 | 0 | 0 | 1.05 | 6 | 1720 | 2.8 |
| 34 | 0.2 | 0 | 0 | 1.02 | 5 | 1620 | 3.0 |
| 35 | 0.2 | 0 | 0 | 1.05 | 6 | 1610 | 3.0 |
| 36 | 0.2 | 0 | 0 | 1.02 | 0.3 | Insufficiently sintered | Insufficiently sintered |
| 37 | 0.2 | 0 | 0 | 1.003 | 6 | Insufficiently sintered | Insufficiently sintered |
| 38 | 0 | 0 | 0.05 | 1.02 | 0.3 | Insufficiently sintered | Insufficiently sintered |
| 39 | 0 | 0 | 0.05 | 1.003 | 6 | Insufficiently sintered | Insufficiently sintered |
| 40 | 0 | 0 | 0.05 | 1.02 | 5 | 2310 | 2.8 |
| 41 | 0 | 0 | 0.05 | 1.05 | 5 | 2100 | 2.8 |
| 42 | 0 | 0 | 0.2 | 1.02 | 6 | 3300 | 2.9 |
| 43 | 0 | 0 | 0.2 | 1.05 | 5 | 2620 | 2.8 |
| 44 | 0 | 0 | 0.2 | 1.02 | 0.3 | Insufficiently sintered | Insufficiently sintered |
| 45 | 0 | 0 | 0.2 | 1.003 | 5 | Insufficiently sintered | Insufficiently sintered |
| 46 | 0 | 0.02 | 0 | 1.02 | 0.3 | Insufficiently sintered | Insufficiently sintered |
| 47 | 0 | 0.02 | 0 | 1.003 | 5 | Insufficiently sintered | Insufficiently sintered |
| 48 | 0 | 0.02 | 0 | 1.02 | 6 | 2360 | 2.4 |
| 49 | 0 | 0.02 | 0 | 1.05 | 5 | 2220 | 2.5 |
| 50 | 0 | 0.2 | 0 | 1.02 | 6 | 2920 | 2.5 |
| 51 | 0 | 0.2 | 0 | 1.05 | 5 | 2400 | 2.5 |
| 52 | 0 | 0.2 | 0 | 1.02 | 0.3 | Insufficiently sintered | Insufficiently sintered |
| 53 | 0 | 0.2 | 0 | 1.003 | 5 | Insufficiently sintered | Insufficiently sintered |

Samples 1 to 29 in Table 1 are for viewing the influences caused by changing the content of $Bi_2O_3$ and the value of m while containing $BaTiO_3$ as a major component.

Samples 30 to 53 in Table 1 are for further viewing the influences caused by element substitution at the Ba sites and the Ti sites of the major component.

The results of Table 1 showed that a dielectric constant of 1500 or more could be obtained and the dielectric loss was as small as 3% or less even by low-temperature firing of 850° C. in the samples which contain $(Ba_{1-x-y}Ca_xSr_y)_m(Ti_{1-z}Zr_z)O_3$ ($0 \leq x+y \leq 0.2$, $0 \leq z \leq 0.2$, and $1.005 \leq m \leq 1.2$) as a major component and in which the content of $Bi_2O_3$ relative to 100 parts by mol of the major component is 0.5 to 20 parts by mol (the content is 1.0 to 40 parts by mol as converted in terms of Bi).

Experimental Example 2

First, a $BaTiO_3$ major component powder was obtained by passing through the same steps as those of Experimental Example 1.

Next, a $Bi_2O_3$ powder and a CuO powder were prepared, weighed so as to satisfy the content shown in Table 2 relative to 100 parts by mol of the major component, and added to the major component powder.

Also, a $BaCO_3$ powder was prepared, weighed so that m of the major component $Ba_mTiO_3$ would be a value shown in Table 2, and added to the major component powder. This was mixed in water for 24 hours in a ball mill and dried to form this into a ceramic powder.

Subsequently, a sample of a stack ceramic capacitor was obtained by passing through the same steps as those of Experimental Example 1 except that the firing temperature was set to be 800° C.

Then, the dielectric constant and the dielectric loss were measured by the same method as that of Experimental Example 1, and the results are shown in Table 2.

TABLE 2

| Sample number | Major component | m | $Bi_2O_3$ (parts by mol) | CuO (parts by mol) | Dielectric constant | tanδ (%) |
|---|---|---|---|---|---|---|
| 101 | $BaTiO_3$ | 1.02 | 5 | 0.1 | 1740 | 2.8 |
| 102 | $BaTiO_3$ | 1.02 | 5 | 0.5 | 1920 | 2.9 |
| 103 | $BaTiO_3$ | 1.02 | 5 | 1 | 2000 | 2.9 |
| 104 | $BaTiO_3$ | 1.02 | 5 | 1.1 | 2100 | 3.3 |

The samples 101 to 104 in Table 2 are for viewing the influences caused by addition of CuO and the amount of addition thereof.

The results of Table 2 showed that, by further allowing Cu to be contained, a dielectric constant of 1500 or more could be obtained even by low-temperature firing of 800° C. Also, the dielectric loss could be restrained to be 3% or less with respect to the samples 101 to 103 in which the content of Cu relative to 100 parts by mol of the major component is within a range of 0.1 to 1 part by mol.

INDUSTRIAL APPLICABILITY

The dielectric ceramic of the present invention is applicable to stack ceramic electronic components, particularly to stack ceramic capacitors, ceramic multi-layer substrates, and others, and contributes to thickness reduction and scale reduction thereof.

DESCRIPTION OF REFERENCE SYMBOLS 1 stack ceramic capacitor
2 ceramic stack body
3 dielectric ceramic layer
4, 5 internal electrodes
6, 7 end surfaces
8, 9 external electrodes
10, 11 first plating layers
12, 13 second plating layers

The invention claimed is:

1. A dielectric ceramic comprising $(Ba_{1-x-y}Ca_xSr_y)_m(Ti_{1-z}Zr_z)O_3$ in which $1.005 \leq m \leq 1.2$, $0 \leq x+y \leq 0.2$, and $0.05 \leq z \leq 0.2$ as a major component and comprising Bi, wherein
the content of the Bi relative to 100 parts by mol of the major component is 1.0 part by mol or more and 40 parts by mol or less.

2. The dielectric ceramic according to claim 1, further comprising Cu.

3. The dielectric ceramic according to claim 2, wherein the content of the Cu relative to 100 parts by mol of the major component is 0.1 parts by mol or more and 1 part by mol or less.

4. The dielectric ceramic according to claim 3, wherein x and y are 0.

5. The dielectric ceramic according to claim 1, wherein x and y are 0.

6. A stack ceramic electronic component comprising a stack body comprising a plurality of stacked dielectric ceramic layers and a plurality of internal electrodes disposed at different interfaces between ceramic layers, and an external electrode disposed on an outer surface of the stack body, wherein
the dielectric ceramic layers comprise the dielectric ceramic according to claim 5.

7. The stack ceramic electronic component according to claim 6, wherein the internal electrode is at least one member selected from the group consisting of Ag, Cu, and Al, or an alloy thereof.

8. A stack ceramic electronic component comprising a stack body comprising a plurality of stacked dielectric ceramic layers and a plurality of internal electrodes disposed at different interfaces between ceramic layers, and an external electrode disposed on an outer surface of the stack body, wherein
the dielectric ceramic layers comprise the dielectric ceramic according to claim 3.

9. The stack ceramic electronic component according to claim 8, wherein the internal electrode is at least one member selected from the group consisting of Ag, Cu, and Al, or an alloy thereof.

10. A stack ceramic electronic component comprising a stack body comprising a plurality of stacked dielectric ceramic layers and a plurality of internal electrodes disposed at different interfaces between ceramic layers, and an external electrode disposed on an outer surface of the stack body, wherein
the dielectric ceramic layers comprise the dielectric ceramic according to claim 1.

11. The stack ceramic electronic component according to claim 10, wherein the internal electrode is at least one member selected from the group consisting of Ag, Cu, and Al, or an alloy thereof.

12. A method of manufacturing a dielectric ceramic composition comprising providing a dielectric ceramic comprising $(Ba_{1-x-y}Ca_xSr_y)_m(Ti_{1-z}Zr_z)O_3$ in which $1.005 \leq m \leq 1.2$, $0 \leq x+y \leq 0.2$, and $0.05 \leq z \leq 0.2$, and combining the dielectric ceramic with a Bi compound, wherein the amount of the Bi compound relative to 100 parts by mol of the dielectric ceramic is 1.0 part by mol or more and 40 parts by mol or less in terms of Bi.

13. The method of manufacturing a dielectric ceramic composition according to claim 12, further comprising combining a Cu compound with the dielectric ceramic.

14. The method of manufacturing a dielectric ceramic composition according to claim 13, wherein the amount of the Cu compound combined with the dielectric ceramic relative to 100 parts by mol of the dielectric ceramic is 0.1 parts by mol or more and 1 part by mol or less in terms of Cu.

15. The method of manufacturing a dielectric ceramic according to claim 12, wherein x and y are 0.

16. A method of manufacturing a stack ceramic electronic component comprising providing a stack body comprising a plurality of stacked dielectric ceramic layers and a plurality of internal electrodes disposed at different interfaces between ceramic layers, and forming an external electrode on an outer surface of the stack body, wherein
    the dielectric ceramic layers comprise a dielectric ceramic according to claim 1.

17. A method of manufacturing a stack ceramic electronic component comprising providing a stack body a comprising a plurality of stacked dielectric ceramic layers and a plurality of internal electrodes disposed at different interfaces between ceramic layers, and forming an external electrode on an outer surface of the stack body, wherein
    the dielectric ceramic layers comprise a dielectric ceramic according to claim 2.

18. A method of manufacturing a stack ceramic electronic component comprising providing a stack body a comprising a plurality of stacked dielectric ceramic layers and a plurality of internal electrodes disposed at different interfaces between ceramic layers, and forming an external electrode on an outer surface of the stack body, wherein
    the dielectric ceramic layers comprise a dielectric ceramic according to claim 3.

19. A method of manufacturing a stack ceramic electronic component comprising providing a stack body a comprising a plurality of stacked dielectric ceramic layers and a plurality of internal electrodes disposed at different interfaces between ceramic layers, and forming an external electrode on an outer surface of the stack body, wherein
    the dielectric ceramic layers comprise a dielectric ceramic according to claim 4.

20. A method of manufacturing a stack ceramic electronic component comprising providing a stack body a comprising a plurality of stacked dielectric ceramic layers and a plurality of internal electrodes disposed at different interfaces between ceramic layers, and forming an external electrode on an outer surface of the stack body, wherein
    the dielectric ceramic layers comprise a dielectric ceramic according to claim 5.

\* \* \* \* \*

UNITED STATES PATENT AND TRADEMARK OFFICE
CERTIFICATE OF CORRECTION

| | |
|---|---|
| PATENT NO. | : 9,064,638 B2 |
| APPLICATION NO. | : 13/803925 |
| DATED | : June 23, 2015 |
| INVENTOR(S) | : Suzuki Shoichiro et al. |

It is certified that error appears in the above-identified patent and that said Letters Patent is hereby corrected as shown below:

ON THE TITLE PAGE

Applicant reads:

(71) Applicant: MURATA MANUFACTURING CO., LTD., ~~Nagaokakyu-shi~~, Kyoto-fu (JP)

Applicant should read:

(71) Applicant: MURATA MANUFACTURING CO., LTD., <u>Nagaokakyo-shi</u>, Kyoto-fu (JP)

Signed and Sealed this
Twenty-second Day of December, 2015

Michelle K. Lee
*Director of the United States Patent and Trademark Office*